United States Patent [19]

FitzSimons et al.

[11] 3,739,099

[45] June 12, 1973

[54] LONG LINE ADAPTER CIRCUIT

[75] Inventors: Alan R. FitzSimons, Laguna Beach; Frank P. Mazac, Santa Ana, both of Calif.

[73] Assignee: San/Bar Electronics Corporation, Long Beach, Calif.

[22] Filed: June 1, 1970

[21] Appl. No.: 42,190

[52] U.S. Cl. .......... 179/16 F

[51] Int. Cl. .......... H04q 1/36, H04b 3/36

[58] Field of Search .......... 179/16 E, 16 F, 16 A, 179/18 F, 18 FA, 18 HB, 16 EA

[56] References Cited

UNITED STATES PATENTS

| | | | |
|---|---|---|---|
| 3,689,700 | 9/1972 | Lent | 179/16 F |
| 3,660,609 | 5/1972 | Tremblay et al. | 179/16 F |
| 3,626,101 | 12/1971 | FitzSimons et al. | 179/16 F |
| 3,166,642 | 1/1965 | Abbott | 179/84 |
| 1,719,499 | 7/1929 | Bowne | 179/16 E |
| 2,954,438 | 9/1960 | Bray et al. | 179/18 F |
| 3,247,327 | 4/1966 | Lanham | 179/16 E |
| 3,508,009 | 4/1970 | Henry et al. | 179/16 F |
| 3,339,027 | 8/1967 | Feiner et al. | 179/16 F |

FOREIGN PATENTS OR APPLICATIONS

| | | | |
|---|---|---|---|
| 1,184,648 | 3/1970 | Great Britain | 179/16 E |

*Primary Examiner*—Kathleen H. Claffy
*Assistant Examiner*—Randall P. Myers
*Attorney*—Jackson & Jones

[57] ABSTRACT

A long line adapter circuit employable with telephone lines used to connect a central office to either normally or abnormally distant subscriber facilities is disclosed. The adapter circuit, which may be physically situated at a central office or at a midplacement point between a central office and a subscriber facility, includes a subscriber loop circuit and a central office loop circuit which are inductively coupled through a line coupling transformer to provide audio coupling between the central office lines and the subscriber lines. The subscriber loop circuit includes a pulsing relay circuit which responds to a receiver being placed in an off-hook condition and to dial pulses generated by a subscriber. A high pass filter is employed to attenuate battery noise due to voltage surges created by the operation of the pulsing relay circuit. Also included is a regulator circuit for preventing saturation of the transformer and for providing current limiting when the adapter circuit is used for short subscriber's lines. The central office loop circuit includes a ringing detector circuit for sensing AC ringing signals transmitted from a central office and a switching circuit which is controlled by an out-pulsing relay circuit. The switching circuit serves to complete or close the central office loop circuit on both outgoing and incoming calls, and to discontinue the application of ringing signals to a subscriber facility on incoming calls.

12 Claims, 2 Drawing Figures

INVENTORS.
ALAN R. FITZSIMONS
FRANK P. MAZAC

BY Jackson & Jones
ATTORNEYS.

PATENTED JUN 12 1973 3,739,099

INVENTORS.
ALAN R. FITZSIMONS
FRANK P. MAZAC
BY
Jackson & Jones
ATTORNEYS

LONG LINE ADAPTER CIRCUIT

BACKGROUND OF THE INVENTION

1. Field of the Invention

This invention generally relates to circuitry for extending the effective range of telephone lines. More particularly, the present invention concerns a long line adapter circuit which enables telephone signals of undiminished quality to be transmitted to and from subscriber facilities that are abnormally distant from a central office.

2. Description of the Prior Art

Due to the progress that has been made in the telephone industry, the transmission of voice intelligence over long distance telephone lines no longer presents a difficult problem. However, the provision of service to subscriber facilities is still hampered by the degradation of "signaling" (dialing, supervisory control, etc.) caused by the attendant excessive resistance of "long lines".

Conventionally, telephone equipment is designed to operate at and tolerate impedances of up to 1200 ohms. Resistances exceeding this 1200 ohms ordinarily degrades the quality of "signaling" by attenuation and distortion. Such degradation results in, for example, misdialing. The amount of impedance imposed by a line is generally directly proportional to the length of the line. Accordingly, the more distant a subscriber facility, such as a telephone subset, is from a central office, the greater the line resistance will be.

Many techniques have been employed in the prior art for the purpose of correcting or compensating for the degenerative effects of abnormally long lines. As an example, lines having a greater diameter, or a lower gauge, have been used to reduce the resistance per unit length imposed by the line. However, the use of such lower gauge telephone lines has the disadvantage of bulk in that where standard multi-line telephone cables are used, a smaller number of lower gauge lines may be included in a standard size cable. Consequently, greater numbers of multi-line cables would be required to provide service to a given number of subscribers where high population density urban areas are involved. As a result, underground conduit capacities may become filled and provide a limiting factor. The use of such lower gauge lines would thus be impractical.

As an alternative to modifying the size of the lines, various long line adapter circuits have been proposed. The operation of some of these adapter circuits includes the use of two voltage levels wherein a high voltage is used for "long lines" and a lower voltage is employed with lines of standard or lesser lengths. Other long line adapter or relay circuits have included transistorized amplifier circuits which are coupled in the line for the purpose of boosting the strength of attenuated transmissions. These circuits, while generally acceptable, have been found to be susceptible to high voltage transients caused by lightning strikes which may destroy the transistors and thereby impair the use of the line. Needless to say, although the prior art includes a number of workable solutions, the degradation of "signaling" continues to be a limiting factor for subscriber facilities that are connected to a central office over long lines.

Ideally, a long line adapter circuit should be capable of accommodating all of the ordinary telephone signaling functions such as dialing, supervisory control, and the like. Additionally, such circuits should be immune to destruction by lightning strikes and should consume little to no power when in an idle state.

Accordingly, it is the intention of the present invention to provide a long line adapter circuit which is readily capable of accommodating all of the ordinary telephone signaling functions and which is able to be physically situated either at a central office or at a midplacement point between the central office and a subscriber facility, either singly or in tandem.

SUMMARY OF THE INVENTION

Briefly described, the present invention involves a long line adapter circuit which serves to extend the effective range of signals over telephone lines.

More particularly, the subject long line adapter circuit is employable with telephone lines used to connect a central office to either normally or abnormally distant subscriber facilities. The adapter circuit, which may be physically situated at a central office or at a midplacement point between a central office and a subscriber facility, includes a subscriber loop circuit and a central office loop circuit which are inductively coupled through a line coupling transformer to provide audio coupling between the central office lines and the subscriber lines.

The subscriber loop circuit includes a pulsing relay circuit which responds to a receiver being placed in an off-hook condition and to dial pulses generated by a subscriber. A high pass filter is employed to attenuate battery noise due to voltage surges created by the operation of the pulsing relay circuit. Also included is a power supply regulator circuit for preventing saturation of the line coupling transformer and for providing current limiting when the adapter circuit is used for short subscriber's lines.

The central office loop circuit includes a ringing detector circuit for sensing ringing signals from a central office. Also included is a switching circuit which is controlled by an out-pulsing relay circuit. The switching circuit serves to complete or close the central office loop circuit on both outgoing and incoming calls, and to discontinue the application of ringing signals to a subscriber facility on incoming calls.

During outgoing call operation, the out-pulsing relay circuit is triggered by the pulsing relay upon a subscriber's receiver being placed in an off-hook condition. For incoming call operation, the out-pulsing relay circuit is triggered by the pulsing relay and by a ring trip relay circuit during silent and ringing periods of a ringing cycle, respectively.

For normal distance, incoming ringing signals are provided in the form of the usual central office ringing current. A ringing generator, for providing regenerative ringing, is employed to furnish incoming ringing signals for abnormally long distance. A patchboard equipped with conventional "U" links is used to adapt the long line adapter circuit for either normal or abnormal distance.

The many attendant advantages of the invention will be more readily appreciated as the same becomes better understood by reference to the following detailed description which is to be considered in connection with the accompanying drawings wherein like reference symbols designate like parts throughout the figures thereof.

DESCRIPTION OF THE PREFERRED EMBODIMENT

Figure 1:
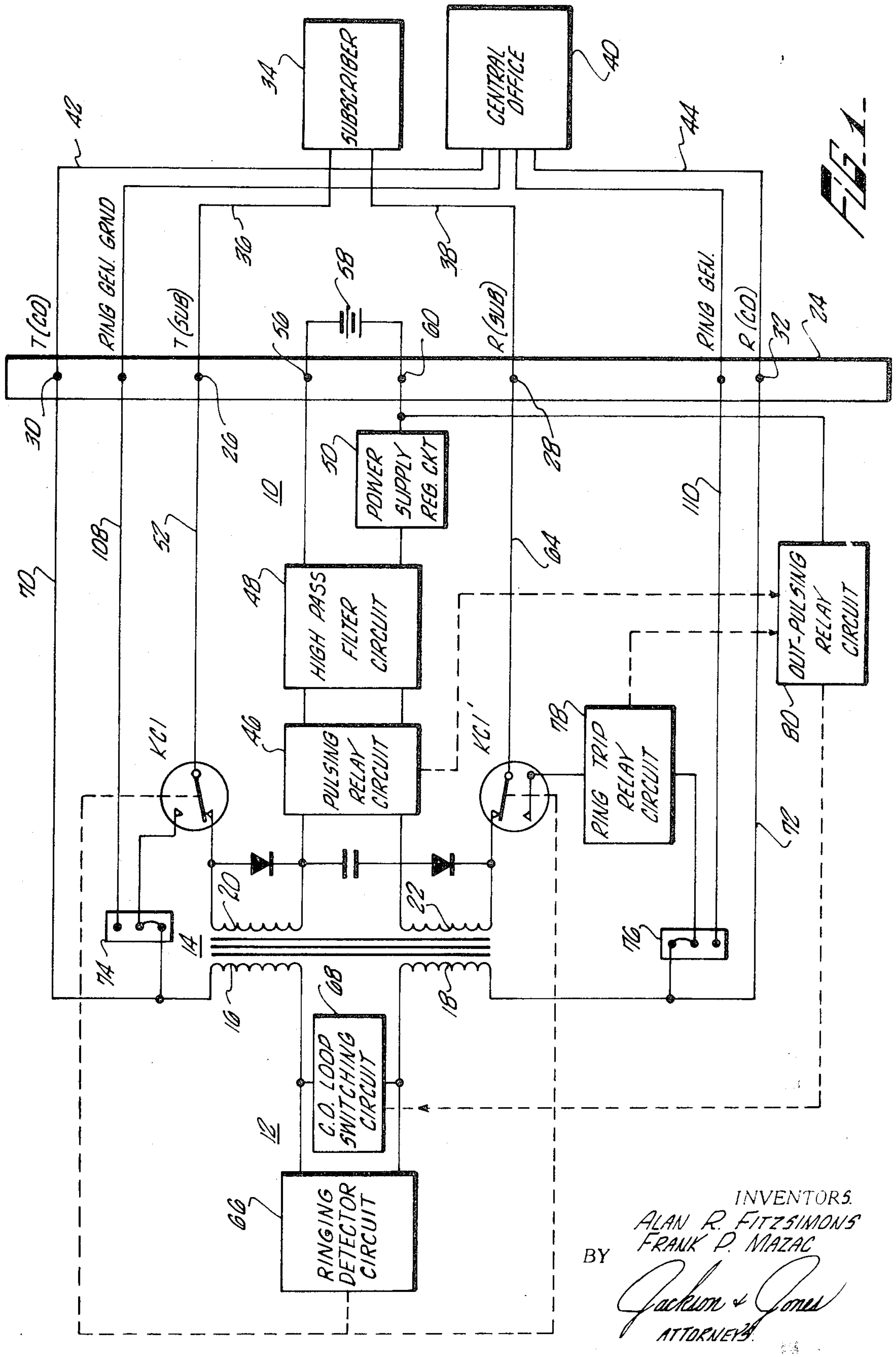
FIG. 1 is a general schematic block diagram illustrating an embodiment of the present invention.

Referring to FIG. 1 of the drawings, a long line adapter circuit, in accordance with the present invention, generally includes a subscriber loop circuit 10 and a central office loop circuit 12 which are inductively coupled by a transformer 14 having a pair of primary coils 16 and 18 and a pair of secondary coils 20 and 22. A terminal board 24 serves to accommodate a subscriber tip terminal 26 and a subscriber ring terminal 28 of the subscriber loop circuit 10. A central office tip terminal 30 and a central office ring terminal 32 are provided for the central office loop circuit 12.

A subscriber facility or subset 34, would be coupled to the subscriber loop circuit 10 of a long line adapter circuit by a customary subscriber loop or line pair including a tip line 36 and a ring line 38. Similarly, a central office 40 would be coupled to the central office loop circuit 12 by a central office loop or line pair including a tip line 42 and a ring line 44.

As shown, the subscriber loop circuit 10 includes a two-coil pulsing relay circuit 46, a high pass filter 48 and a power supply regulator circuit 50 which are serially connected. Starting at the terminal 26, the tip side of the subscriber loop section 10 may be traced through a lead 52, a relay contact KCl (shown in a normal position), the secondary coil 20, one coil of the pulsing relay circuit 46, the high pass filter circuit 48 and to a positive terminal 56 of a battery 58. Starting at a negative battery terminal 60, the ring side of the subscriber loop section 10 may be traced through the power supply regulator circuit 50, the high pass filter 48, the pulsing relay circuit 46, the secondary coil 22, a relay contact KC1' (shown in a normal position), a lead 64 and to the ring terminal 28. A subscriber loop is completed by having the subscriber tip and ring leads 36 and 38 respectively coupled to the tip and ring terminals 26 and 28.

Briefly, the pulsing relay circuit 46 responds to a receiver of the subset 34 being placed in an off-hook condition and to dialing pulses generated at the subscriber subset 34. The high pass filter 48 serves to attenuate battery noise caused by voltage surges generated by the operation of the pulsing relay circuit 46. The power supply regulator circuit 50 operates to prevent saturation of the transformer 14 and to provide current limiting when the adapter circuit is used with short subscriber's lines.

The central office loop section 12 includes a ringing detector circuit 66 and a switching circuit 68 which is connected in parallel with the ringing detector circuit 66. Starting at the central office tip terminal 30, the central office loop 12 may be traced through a lead 70, the primary coil 16, the switching circuit 68, the primary coil 18, a lead 72 and to the central office ring terminal 32. A central office loop may thus be completed by the central office tip and ring leads 42 and 44 being respectively coupled to the central office tip and ring terminals 30 and 32.

The ringing detector circuit 66 serves to sense the presence of ringing current being applied from the central office 40. Conventionally, this ringing current is primarily an alternating current, of a predetermined frequency, which includes a nominal background direct current. The switching circuit 68 serves to controllably close or open the central loop such that when the switching circuit 68 is closed, the central office loop is completed and the ringing detector circuit 66 is shunted.

Briefly considering the operation of the present invention, assume first that the subscriber subset 34 belongs to a party being called. A ringing current would be applied over the central office lines 42 and 44, through the central office tip and ring lines 70 and 72 to the ringing detector circuit 66. This ringing current would be sensed and the relay contacts KC1 and KC1' would be operated to reverse their positions. The ringing current would then be applied to the subscriber subset 34 through a patchboard 74, the relay contact KCl, the subscriber tip lead 52, and the subscriber tip line 36, on the tip side, and through a patchboard 76, a ring trip relay circuit 78, the relay contact KC1', the subscriber ring lead 64, and the subscriber ring line 38 on the ring side. Such application of the ringing current to the subscriber subset 34 will cause the customary bell, or buzzer, included therein to be operated. Upon the receiver of the subscriber subset 34 being lifted off the hook, the subscriber loop will be closed. The pulsing relay circuit 46 or the ring trip relay circuit 78 will then respond to the direct current applied thereto, in a manner to be hereinafter discussed in greater detail, and trigger an out-pulsing relay circuit 80. This triggering of the out-pulsing relay circuit 80 will serve to close the switching circuit 68. Closure of the switching circuit 68 serves to shunt the ringing detector circuit 66, as earlier mentioned, the relay contacts KC1 and KC1' being thereby permitted to revert to their normal positions (as shown). The customary transmission of audio intelligence is then allowed to take place between the subscriber subset 34 and the central office 40 through the long line adapter circuit.

In the situation where the subscriber subset 34 belongs to a calling party, the receiver is first lifted off the hook to be thereby converted to an off-hook condition. Conventionally, a telephone subset operates to close the line when in an off-hook condition and operates to periodically open the line during dialing. The subscriber loop being closed by the receiver off-hook condition, direct current is applied to the pulsing relay circuit 46 from the battery 58. Operation of the pulsing relay circuit 46 again results in the switching circuit 68 being closed by the triggering of the out-pulsing relay circuit 80. The central office loop is thus closed and the conventional line seizure at the central office 40 will occur. Subsequent dialing at the subscriber subset 34 will cause the subscriber loop to be periodically opened and closed and, as a result, pulses of direct current will be applied to the pulsing relay circuit 46 from the battery 58. The pulsing relay circuit 46 will respond to the periodic or pulsed application of direct current from the battery 58 to cause the switching circuit 68 to be similarly opened and closed. Dialing signals are thereby transmitted to the central office 40 in the form of pulses corresponding to the opening and closing of the central office loop circuit 12.

Figure 2:
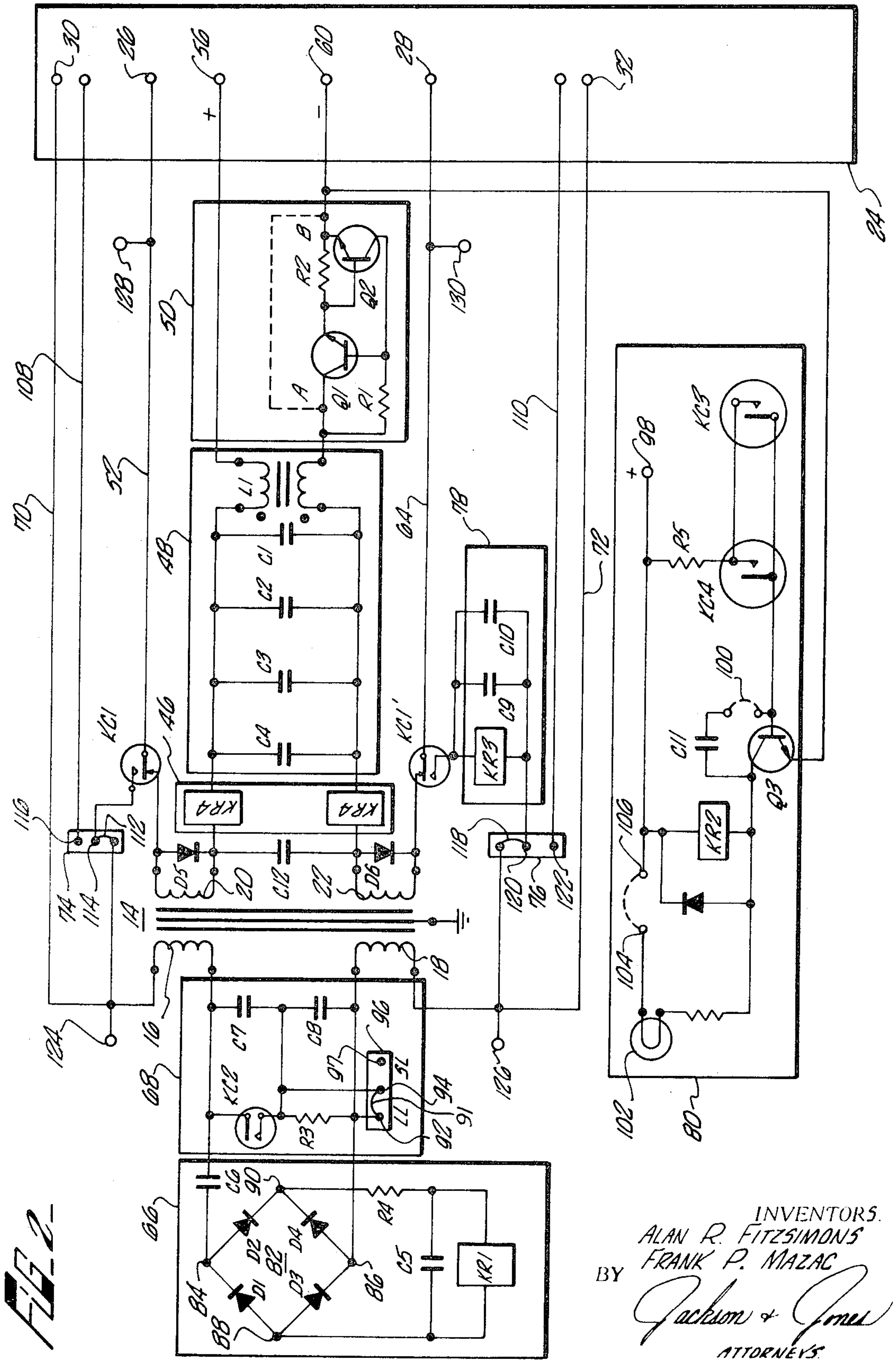
FIG. 2 is a detailed schematic circuit diagram illustrating an embodiment of the present invention.

Referring now to FIG. 2 of the drawings, the present invention is illustrated in greater detail. The pulsing relay circuit 46 includes a pair of relay coils KR4 which are coupled between the secondary coils 20 and 22 and the battery 58 such that a first tip side relay coil is serially coupled between the secondary coil 20 and the positive battery terminal 56 and a second ring side relay coil is serially coupled between the secondary coil 22 and the negative battery terminal 60. The pulsing relay circuit 46 may be a conventional pulsing reed type relay which is responsive to the application of direct current to the relay coils KR4 included therein.

The high pass filter circuit 48 is coupled across the positive and negative battery terminals 56 and 60. Included in the battery filter is a choke L1 and a series of parallel coupled capacitors C1, C2, C3 and C4. As earlier mentioned, the high pass filter circuit 48 serves to provide attenuation of the battery noise created by the operation of the pulsing relay circuit 46.

The power supply regulator circuit 50 is coupled in series with the battery 58 in the ring side of the subscriber loop circuit 10. As shown, the regulator circuit 50 includes a conventional series connected transistor configuration including a pair of transistors Q1 and Q2, and a pair of biasing resistors R1 and R2. It is understood that any other transistor configuration adapted to provide current limiting may be employed. As earlier mentioned, the regulator 50 serves to current limit the long line adapter circuit when used on very short subscriber lines. This current limiting is also necessary to prevent saturation of the line coupling transformer 14 and to prevent deterioration of audio intelligence signals transmitted between the subscriber facility 34 and the central office 40.

Also, as earlier mentioned, the present invention is adapted to be employed for either "long lines" or with lines of normal or shorter length. As an example, long line operation may involve up to 1,500 ohms of central office line and 2,150 ohms of subscriber's lines. Tandem employment of the adapter circuits may involve a midsection line of up to 3200 ohms. When such high resistances are involved, the current limiting provided by the regulator 50 is unnecessary. Accordingly, the regulator 50 may be short circuited by being strapped across the points A and B. The regulator 50 would then be operatively eliminated from the subscriber loop circuit 10.

The ringing detector circuit 66 includes a full wave diode bridge rectifier 82 including a series of diodes D1, D2, D3 and D4 configured to have a pair of input terminals 84 and 86 and a pair of output terminals 88 and 90. The input terminal 84, as shown, is connected through the primary coil 16 to the central office tip lead 70 while the output terminal 86 is coupled through the primary coil 18 to the central office ring lead 72. A coil KR1 of a conventional ringing type relay is coupled across the output terminals 88 and 90 and controls the operation of the relay contacts KC1 and KC1'. A capacitor C5 is coupled in parallel with the relay coil KR1 of the ringing relay for the purpose of providing transient damping to prevent false operation of the ringing relay as a result of, for example, induced high alternating current voltages appearing on the central office lines 42 and 44. A capacitor C6 coupled in series between the bridge input terminal 84 and the primary coil 16 serves to effectively block the flow of direct current through the rectifier 82.

The switching circuit 68 is coupled between the primary coils 16 and 18 and in parallel with the full wave rectifier 82 to effectively complete a central office loop. Included in the switching circuit 68 is a relay contact KC2 coupled in series with a resistor R3. The relay contact KC2 may be of the conventional mercury wetted type and is shunted by a capacitor C7 which provides arc suppression for the relay contact KC2. The resistor R3, which serves to current limit the central office line, is shunted by a capacitor C8 which provides an audio or speech by-pass for the resistor R3. In the case of extremely long line operation both the capacitor C8 and the resistor R3 may be eliminated from the circuit by being short circuited. This may be accomplished by attaching a "U" link 91 between a set of terminals 92 and 94 of a patchboard 96. For normal or shorter range operation the "U" link 91 may be disconnected or stored by being coupled between the terminals 94 and 97 to effectively retain the resistor R3 and the capacitor C7 in the switching circuit 68.

The ring trip relay circuit 78 includes a relay coil KR3 of a conventional ring trip reed type relay. The relay coil KR3 is shunted by a large capacitance represented by the parallel coupled capacitors C9 and C10. These capacitors C9 and C10 serve to provide a low impedance path for alternating current such that the relay KR3 will only respond to the application of direct current. As shown, the ring trip relay circuit 78 is coupled in series between the patchboard 76 and the relay contact KC1' such that a reversal in the position of the relay contact KC1' will serve to connect the ring trip relay circuit 78 to the subscriber ring lead 64. Generally the ring trip relay circuit 78 operates to discontinue the application of AC ringing currents to a subscriber subset 34 during a ringing period and upon the receiver of the subscriber subset 34 being converted to an off-hook condition.

The out-pulsing relay circuit 80 serves to control the opening and closing of the relay contact KC2, included in the switching circuit 68. This is accomplished by the operation of a conventional mercury wetted reed type relay having a relay coil KR2 included in the out-pulsing relay circuit 80. Direct current is applied to the relay coil KR2 by a transistor Q3 which is adapted to be base driven through a resistor R5 by the closure of either of a pair of parallel connected relay contacts KC3 or KC4. Operation of the relay contact KC3 is controlled by the relay coil KR3 included in the ring trip relay circuit 78 while operation of the relay contact KC4 is controlled by the relay coils KR4 of the pulsing relay circuit 46.

A capacitor C11 may be coupled between the collector and the base of the transistor Q3 for the purpose of providing pulse correction when the long line adapter is operating into a standard "A" relay of the central office 40. On extra long distance operation, it has been found that optimal pulsing of less than 1 percent distortion may be obtained by eliminating the capacitor C11. This may be accomplished by severing the strap 100 for the purpose of disconnecting the capacitor C11. A check lamp 102 may be included in the out-pulsing relay circuit 80 by being connected in parallel with the relay coil KR2. A pair of check lamp terminals 104 and 106 are provided for the purpose of enabling the check lamp 102 to be operatively coupled in the out-pulsing relay circuit 80.

A pair of diodes D5 and D6 are used to shunt the transformer secondary coils 20 and 22, respectively. These diodes D5 and D6 serve to suppress transient voltages and thereby prevent false operation of the ring trip relay, including the relay coil KR3, upon the operation of the ringing relay included in the ringing detector circuit 66. The capacitor C12 provides termination and speech by-pass between the secondary coils 20 and 22. Otherwise stated, the capacitor C12 provides a low impedance path for AC audio or voice intelligence signals between the coils 20 and 22 while at the same time providing a high impedance path for direct current signals.

Briefly summarizing the operative relationship of the relays included in a long line adapter circuit, in accordance with the present invention, the relay coil KR1, included in the ringing detector circuit 66, is associated with the relay contacts KC1 and KC1'. The relay coil KR2, included in the out-pulsing relay circuit 80, is associated with the relay contact KC2 included in the switching circuit 68. The relay coil KR3, included in the ring trip relay circuit 78, and the relay coils KR4 of the pulsing relay 46 are respectively associated with the relay contacts KC3 and KC4 included in the out-pulsing circuit 80.

By way of example, but not in a limiting sense, elements having the below enumerated types or values may be used in a long line adapter circuit, in accordance with the present invention.

| | |
|---|---|
| Capacitors C1, C2, C3, C4 | 40 microfarads |
| Capacitor C5 | 2 microfarads |
| Capacitor C6 | 2 microfarads |
| Capacitor C7 | .01 microfarads |
| Capacitor C8 | 15 microfarads |
| Capacitors C9, C10 | 500 microfarads |
| Capacitor C11 | .0033 microfarads |
| Capacitor C12 | 6 microfarads |
| Resistor R1 | 3.3 kiloohms |
| Resistor R2 | 22.5 ohms |
| Resistor R3 | 600 ohms |
| Resistor R4 | 3 kiloohms |
| Resistor R5 | 75 kiloohms |
| Transistor Q1 | type 40412 |
| Transistor Q2 | type 2N 3568 |
| Transistor Q3 | type 2N 3568 |
| Ringing Relay (KR1, KC1) | ringing type |
| Out-pulsing Relay (KR2, KC2) | mercury wetted reed type |
| Ring Trip Relay (KR3, KC3) | ring trip reed type |
| Pulsing Relay (KR4, KC4) | battery feed reed type |

Considering the operation of the present invention in greater detail, standard AC ringing current will be applied from the central office 40 to the central office tip and ring leads 70 and 72 when the subscriber subset 34 is being called. The AC ringing current will be applied through the primary coils 16 and 18 to the input terminals 84 and 86 of the diode bridge rectifier 82. The resulting DC current developed across the rectifier output terminals 88 and 90 will be applied to the relay coil KR1 of the ringing relay and thereby cause the relay contacts KC1 and KC1' to reverse their positions during the ringing periods. The AC ringing current is thereby applied to the bell, or ringer, of the subscriber subset 34 through the subscriber tip and ring leads 52 and 64. Upon the answering of the ringing produced at the subscriber subset 34 by the receiver thereof being converted to an off-hook condition, the subscriber loop is closed. Whenever this occurs during a ringing period, the ring trip relay circuit 78 will be serially coupled to the subscriber ring lead 64 through the relay contact KC1'. The earlier mentioned standard background direct current mixed with the AC ringing current will serve to energize the relay coil KR3 to produce the closure of the relay contact KC3 in the out-pulsing relay circuit 80. This closure of the relay contact KC3 will trigger the relay drive transistor Q3 to produce the energization of the relay coil KR2 and the consequent closure of the relay contact KC2 in the switching circuit 68. This closure of the relay contact KC2 effectively discontinues the application of AC ringing signals to the subscriber subset 34 by short circuiting the ringing detector circuit 66 and thereby permitting the relay contacts KC1 and KC1' to revert to their normal positions. Closure of the relay contact KC2, also serves to complete the central office loop and the normal transmission of audio or voice intelligence between the subscriber subset 34 and the central office (linking a calling party) may take place.

During the silent periods, between the standard ringing periods, the discontinuance of the application of AC ringing current to the subscriber subset 34 is accomplished by pulsing relay coils KR4. As earlier explained, a receiver off-hook condition will close the subscriber loop. DC current will then be provided from the battery 58 to energize the pulsing relay coils KR4. The relay contact KC4 will consequently be closed and the out-pulsing relay coil KR2 will be energized by the transistor Q3. Energization of the relay coil KR2 serves to close the relay contact KC2 in the switching circuit 68, to thereby complete the central office loop, and simultaneously, short circuit or shunt the ringing detector circuit 66 to discontinue the application of AC ringing current to the subscriber subset 34 by allowing the relay contacts KC1 and KC1' to remain in their normal positions.

In some instances, it may be desirable to operate in a regenerative ringing mode wherein reconstituted ringing signals are provided at the central office 40 by a standard ringing generator. Accordingly, a pair of ringing generator leads 108 and 110 are connected between the terminal board 24 and the respective patchboards 74 and 76. The present invention may then be adapted to apply reconstituted AC ringing current to the subscriber subset by having a "U" link 112 connect the terminals 114 and 116 on the patchboard 74 and a "U" link 118 connect the terminals 120 and 122 on the patchboard 76. Operation of the relay contacts KC1 and KC1' by the ringing relay coil KR1 will then serve to connect the subscriber tip and ring leads 52 and 64 to the respective ringing generator leads 108 and 110. As is customary, the reconstituted AC ringing current will also include a background DC current. The receiver of the subscriber subset 34 being converted to an off-hook condition during the ringing period will, as such, energize the ring trip relay coil KR3 in the manner earlier described.

When the subscriber subset 34 belongs to a calling party, a receiver off-hook condition energizes the pulsing relay coils KR4, as earlier explained, and the out-pulsing relay coil KR2 is energized by the closure of the relay contact KC4. The consequent closure of the relay contact KC2 completes the central office loop and line seizure occurs in the conventional manner at the central office 40. Dialing at the subscriber subset 34 will then serve to open and close the subscriber loop which will consequently cause the pulsing relay 46 to be pulsed due to the periodic application of DC current to the pulsing relay coils KR4. Accordingly, the relay contact KC4 is periodically opened and closed and the resulting pulsed operation of the transistor Q3 causes the out-pulsing relay coil KR2 and the relay contact KC2 to be pulsed. The dialing signals are thus transmitted to the central office 40 in the form of pulses corresponding to the opening and closing of the respective central office and subscriber loops.

In order that the customary testing of telephone equipment be extended to the long line adapter circuit, a series of test points are provided to facilitate the testing of the present invention. Specifically, a pair of central office loop test points 124 and 126 are provided for the central office loop circuit 12 and a pair of subscriber loop test points 128 and 130 are provided for the subscriber loop circuit 10. Conventional test apparatus, well known in the prior art, may be employed to test the respective central office and subscriber loops.

From the foregoing detailed discussion, it is now clear that the present invention provides a long line adapter circuit which is capable of being employed to effectively extend the range of "signaling" on telephone lines. The absence of line connected transistors renders the invention immune to damage from high voltage transients created by adjacent lightning strikes.

While a preferred embodiment of the present invention has been described hereinabove, it is intended that all matter contained in the above description and shown in the accompanying drawings, be interpreted as illustrative, and not in a limiting sense, and that all modifications, constructions and arrangements which fall within the scope and spirit of the present invention may be made.

What is claimed is:

1. A long line adapter circuit for effectively compensating for the degenerative effects of abnormally long telephone lines connecting a central telephone office to a subscriber subset adapted to be in either an on-hook or an off-hook operating condition, said circuit comprising:

- a central office loop circuit adapted to be connected to said central telephone office via a central office pair of telephone lines, said central office loop circuit including:
  - first means, connected to said central office via said central office pair of telephone lines, for detecting ringing current transmitted from said central telephone office and for enabling said ringing current to be applied to said subscriber subset, and
  - switching means, bridged across the first means and including a resistive path, for controllably opening and closing said resistive path in accordance with the operating condition of said subset, said resistive path shunting said first means when closed, a subscriber loop circuit adapted to be connected to said subscriber subset via a subscriber pair of telephone lines, said subscriber loop circuit including:
  - control means for effectively controlling said switching means in response to the operating condition of said subset,
  - terminal means for enabling direct current power to be applied to said subscriber pair of telephone lines,
  - a power supply regulator circuit connected to said terminal means for regulating the power applied to said subscriber loop circuit from a power source connected to said terminal means, and
  - a high pass filter circuit shunting said terminal means; and
  - transformer means for inductively coupling said subscriber loop circuit and said central office loop circuit.

2. The apparatus defined by claim 1 wherein said control means includes:

- an out-pulsing relay circuit, operatively coupled to said switching means, for controllably operating said switching means to close said resistive path whenever said out-pulsing relay circuit is activated;
- a pulsing relay circuit, operatively coupled to said out-pulsing relay circuit, for controllably activating said out-pulsing relay circuit; and
- a ring trip relay circuit, operatively coupled to said out-pulsing circuit, for controllably activating said out-pulsing relay circuit during periods in which ringing current is detected by said first means wherein either said pulsing relay circuit or said ring trip relay circuit serves to activate said out-pulsing relay circuit whenever said subset is in an off-hook operating condition.

3. The apparatus defined by claim 2 wherein said out-pulsing relay circuit includes:

- an out-pulsing relay coil, operatively coupled to said switching means, for closing said resistive path whenever said out-pulsing relay coil is energized;
- transistor means for energizing said out-pulsing relay coil whenever said transistor means is biased into conduction;
- a ring trip relay contact having an open position and a closed position, said transistor means being biased into conduction when said ring trip relay contact is maintained in a closed position; and
- a pulsing relay contact, having an open position and a closed position, said pulsing relay contact being in parallel with said ring trip relay contact, said transistor means being biased into conduction when said pulsing relay contact is maintained in a closed position.

4. The apparatus defined by claim 3 wherein said pulsing relay circuit includes pulsing relay coil means for maintaining said pulsing relay contact in a closed position whenever said subscriber subset is in an off-hook operating condition and ringing current is not detected by said first means.

5. The apparatus defined by claim 4 wherein said ring trip relay circuit includes a ring trip relay coil for maintaining said ring trip relay contact in a closed position whenever ringing current is detected by said first means and said subscriber subset is in an off-hook operating condition.

6. The apparatus defined by claim 1 wherein said central office pair of telephone lines include a central tip lead and a central ring lead and said subscriber pair of telephone lines include a subscriber tip lead and a subscriber ring lead and wherein said first means includes:

- a full-wave rectifier circuit having a pair of input terminals and a pair of output terminals, said input terminals being respectively connected to said central tip lead and said central ring lead, said rectifier circuit serving to provide direct current at said output terminals in response to the application of ringing current to said input terminals;
- first and second ringing relay contacts for controllably connecting said subscriber tip and ring leads to said central tip and ring leads or connecting said subscriber tip and ring leads to said transformer means; and a ringing relay coil, coupled between said output terminals, for operating said first and second ringing relay contacts to operatively connect said central tip lead to said subscriber tip lead and said central ring lead to said subscriber ring lead in response to the application of direct current to said ringing relay coil.

7. The apparatus defined by claim 6 wherein said switching means further includes a switching relay contact operatively coupled in series with said resistive path and across said pair of input terminals of said full-wave rectifier circuit.

8. The apparatus defined by claim 7 wherein said resistive path includes a resistor coupled in series with said switching relay contact for limiting the flow of current through said central office loop circuit to a predetermined amount, said switching means further including:

capacitive means, coupled in parallel with said resistor for providing an audio by-pass connection between said central tip and ring leads; and means, operatively coupled to said resistor and said capacitive means, for controllably short circuiting said resistor and said capacitive means.

9. The apparatus defined by claim 7 wherein said control means includes:

an out-pulsing relay circuit, operatively coupled to said switching means, for controllably closing said switching relay contact whenever said out-pulsing relay circuit is activated;

a pulsing relay circuit, operatively coupled to said out-pulsing relay circuit, for controllably activating said out-pulsing relay circuit; and a ring trip relay circuit, operatively coupled to said out-pulsing circuit, for controllably activating said out-pulsing relay circuit during periods in which ringing current is detected by said first means wherein either said pulsing relay circuit or said ring trip relay circuit serves to activate said out-pulsing relay circuit whenever said subset is in an off-hook operating condition.

10. The apparatus defined by claim 9 wherein said out-pulsing relay circuit includes:

an out-pulsing relay coil, operatively coupled to said switching relay contact, for closing said switching relay contact whenever said out-pulsing relay coil is energized;

transistor means for energizing said out-pulsing relay coil whenever said transistor is biased into conduction;

a ring trip relay contact having an open position and a closed position, said transistor means being biased into conduction when said ring trip relay contact is maintained in a closed position; and a pulsing relay contact, having an open position and a closed position, said pulsing relay contact being in parallel with said ring trip relay contact, said transistor means being biased into conduction when said pulsing relay contact is maintained in a closed position.

11. The apparatus defined by claim 10 wherein said pulsing relay circuit includes pulsing relay coil means for maintaining said pulsing relay contact in a closed position in response to the application of direct current thereto whenever said subscriber subset is in an off-hook operating condition and ringing current is not detected by said first means.

12. The apparatus defined by claim 11 wherein said ring trip relay circuit is connected to said central ring lead and to said second ringing relay contact, said ring trip relay circuit including a ring trip relay coil for maintaining said ring trip relay contact in a closed position whenever ringing current is detected by said first means and said subscriber subset is in an off-hook operating condition.

* * * * *